(12) United States Patent
Slinger et al.

(10) Patent No.: US 8,068,680 B2
(45) Date of Patent: Nov. 29, 2011

(54) PROCESSING METHODS FOR CODED APERTURE IMAGING

(75) Inventors: Christopher William Slinger, Ledbury (GB); Geoffrey Derek De Villiers, Malvern (GB); Douglas Alan Payne, Worcester (GB)

(73) Assignee: Qinetiq Limited, London (GB)

( * ) Notice: Subject to any disclaimer, the term of this patent is extended or adjusted under 35 U.S.C. 154(b) by 688 days.

(21) Appl. No.: 12/278,524

(22) PCT Filed: Feb. 6, 2007

(86) PCT No.: PCT/GB2007/000407
§ 371 (c)(1),
(2), (4) Date: Aug. 6, 2008

(87) PCT Pub. No.: WO2007/091049
PCT Pub. Date: Aug. 16, 2007

(65) Prior Publication Data
US 2009/0028451 A1   Jan. 29, 2009

(30) Foreign Application Priority Data
Feb. 6, 2006 (GB) .................................. 0602386.5

(51) Int. Cl.
*G06K 9/00* (2006.01)
*G06K 9/36* (2006.01)

(52) U.S. Cl. ........ 382/232; 382/128; 356/310; 356/326; 356/328

(58) Field of Classification Search .......... 382/128–132, 382/232–253; 356/310, 326, 328
See application file for complete search history.

(56) References Cited

U.S. PATENT DOCUMENTS

| 3,860,821 A | 1/1975 | Barrett |
| 3,961,191 A | 6/1976 | Stoner et al. |
| 4,075,483 A | 2/1978 | Tancrell et al. |
| 4,092,540 A | 5/1978 | Barrett |
| 4,165,462 A | 8/1979 | Macovski et al. |
| 4,209,780 A * | 6/1980 | Fenimore et al. ............. 382/278 |
| 4,228,420 A * | 10/1980 | Fenimore et al. ............. 382/324 |
| 4,360,797 A * | 11/1982 | Fenimore et al. ............. 382/278 |
| 4,389,633 A * | 6/1983 | Fenimore ..................... 382/204 |
| 4,891,844 A * | 1/1990 | Kiri ............................... 382/132 |
| 4,954,789 A | 9/1990 | Sampsell |

(Continued)

FOREIGN PATENT DOCUMENTS

DE    25 28 641 A1    1/1976

(Continued)

OTHER PUBLICATIONS

Jan. 12, 2011 Office Action issued in U.S. Appl. No. 12/278,528.

(Continued)

*Primary Examiner* — Manav Seth
(74) *Attorney, Agent, or Firm* — Oliff & Berridge PLC (57) ABSTRACT

The present invention relates to processing of coded aperture images. Multiple frames of data acquired by the coded aperture imaging system, each with a different coded aperture array, are processed to form an image. The processing incorporates the constraints that the image solution must be positive and that the solution should be zero outside an expected image region. In one embodiment image enhancement may involve dividing the processed image into image regions having a spatially invariant point spread function and solving an inverse problem for each image region to reduce image blurring.

23 Claims, 6 Drawing Sheets

U.S. PATENT DOCUMENTS

| | | | |
|---|---|---|---|
| 5,036,546 A * | 7/1991 | Gottesman et al. | 382/321 |
| 5,047,822 A | 9/1991 | Little, Jr. et al. | |
| 5,115,335 A | 5/1992 | Soref | |
| 5,294,971 A | 3/1994 | Braunecker et al. | |
| 5,311,360 A | 5/1994 | Bloom et al. | |
| 5,426,312 A | 6/1995 | Whitehead | |
| 5,448,395 A | 9/1995 | Lopez et al. | |
| 5,488,504 A | 1/1996 | Worchesky et al. | |
| 5,500,761 A | 3/1996 | Goossen et al. | |
| 5,519,529 A | 5/1996 | Ahearn et al. | |
| 5,552,912 A | 9/1996 | Sharp et al. | |
| 5,579,149 A | 11/1996 | Moret et al. | |
| 5,627,639 A * | 5/1997 | Mende et al. | 356/310 |
| 5,636,001 A | 6/1997 | Collier | |
| 5,636,052 A | 6/1997 | Arney et al. | |
| 5,710,656 A | 1/1998 | Goossen | |
| 5,772,598 A | 6/1998 | Halling | |
| 5,784,189 A | 7/1998 | Bozler et al. | |
| 5,825,528 A | 10/1998 | Goossen | |
| 5,838,484 A | 11/1998 | Goossen | |
| 5,841,579 A | 11/1998 | Bloom et al. | |
| 5,870,221 A | 2/1999 | Goossen | |
| 5,943,155 A | 8/1999 | Goossen | |
| 5,949,571 A | 9/1999 | Goossen et al. | |
| 5,953,161 A | 9/1999 | Troxell et al. | |
| 5,995,251 A | 11/1999 | Hesselink et al. | |
| 6,034,807 A | 3/2000 | Little et al. | |
| 6,069,361 A | 5/2000 | Rubinstein | |
| 6,195,412 B1 * | 2/2001 | Tobin et al. | 378/87 |
| 6,205,195 B1 * | 3/2001 | Lanza | 376/157 |
| 6,324,192 B1 | 11/2001 | Tayebati | |
| 6,329,967 B1 | 12/2001 | Little et al. | |
| 6,392,235 B1 | 5/2002 | Barrett et al. | |
| 6,396,976 B1 | 5/2002 | Little et al. | |
| 6,424,450 B1 | 7/2002 | Goossen | |
| 6,430,333 B1 | 8/2002 | Little et al. | |
| 6,467,879 B1 | 10/2002 | Kubby et al. | |
| 6,519,073 B1 | 2/2003 | Goossen | |
| 6,570,143 B1 | 5/2003 | Neil et al. | |
| 6,737,652 B2 * | 5/2004 | Lanza et al. | 250/363.06 |
| 6,819,463 B2 | 11/2004 | Noonan | |
| 6,819,466 B2 | 11/2004 | Tayebati | |
| 6,856,449 B2 | 2/2005 | Winkler et al. | |
| 7,006,132 B2 | 2/2006 | Pereira et al. | |
| 7,027,634 B2 * | 4/2006 | Odell | 382/144 |
| 7,031,577 B2 | 4/2006 | Painter et al. | |
| 7,209,579 B1 * | 4/2007 | Weisenberger et al. | 382/128 |
| 7,235,773 B1 | 6/2007 | Newman | |
| 7,251,396 B2 | 7/2007 | Larochelle et al. | |
| 7,283,232 B2 * | 10/2007 | Brady et al. | 356/326 |
| 7,415,049 B2 | 8/2008 | Flanders et al. | |
| 7,671,321 B2 * | 3/2010 | Perlman et al. | 250/216 |
| 7,767,949 B2 * | 8/2010 | Perlman et al. | 250/208.1 |
| 7,767,950 B2 * | 8/2010 | Perlman et al. | 250/208.1 |
| 7,888,626 B2 * | 2/2011 | Slinger et al. | 250/226 |
| 2002/0075990 A1 | 6/2002 | Lanza et al. | |
| 2003/0058520 A1 | 3/2003 | Yu et al. | |
| 2003/0122955 A1 | 7/2003 | Neidrich | |
| 2003/0164814 A1 | 9/2003 | Starkweather et al. | |
| 2003/0191394 A1 | 10/2003 | Simon et al. | |
| 2004/0008397 A1 | 1/2004 | Noonan | |
| 2004/0046123 A1 | 3/2004 | Dausch | |
| 2005/0057793 A1 | 3/2005 | Starkweather et al. | |
| 2005/1024882 | 11/2005 | Starkweather et al. | |
| 2006/0038705 A1 | 2/2006 | Brady et al. | |
| 2006/0157640 A1 | 7/2006 | Perlman et al. | |
| 2007/0013999 A1 | 1/2007 | Marks et al. | |
| 2007/0091051 A1 | 4/2007 | Shen | |
| 2007/0263914 A1 * | 11/2007 | Tibbetts | 382/129 |
| 2008/0128625 A1 | 6/2008 | Lamadie et al. | |
| 2008/0151391 A1 | 6/2008 | Zalevsky et al. | |
| 2008/0240535 A1 * | 10/2008 | Frangioni et al. | 382/131 |
| 2008/0259354 A1 | 10/2008 | Gharib et al. | |
| 2008/0285034 A1 | 11/2008 | Gharib et al. | |
| 2009/0008565 A1 | 1/2009 | Gottesman | |
| 2009/0020714 A1 | 1/2009 | Slinger | |
| 2009/0022410 A1 | 1/2009 | Haskell | |
| 2009/0090868 A1 | 4/2009 | Payne | |
| 2009/0167922 A1 | 7/2009 | Perlman et al. | |

FOREIGN PATENT DOCUMENTS

| | | |
|---|---|---|
| EP | 0 318 249 A2 | 5/1989 |
| EP | 0 663 763 A2 | 7/1995 |
| EP | 1 341 025 A1 | 9/2003 |
| EP | 1 491 958 A2 | 12/2004 |
| EP | 1 494 046 A1 | 1/2005 |
| EP | 1 627 526 | 2/2006 |
| GB | 1 449 636 | 9/1976 |
| GB | 2314664 | 1/1998 |
| GB | 2 350 472 | 11/2000 |
| GB | 2 414 881 A | 12/2005 |
| GB | 2 418 028 A | 3/2006 |
| GB | 2434935 | 8/2007 |
| JP | A-55-146411 | 11/1980 |
| JP | A-58-060723 | 4/1983 |
| JP | A-04-005620 | 1/1992 |
| JP | A-09-113819 | 5/1997 |
| JP | A-2001-218116 | 8/2001 |
| JP | A-2003-4441 | 1/2003 |
| JP | A-2005-202225 | 7/2005 |
| WO | WO 91/12502 A1 | 8/1991 |
| WO | WO 94/18582 A1 | 8/1994 |
| WO | WO 96/24032 | 8/1996 |
| WO | WO 97/26557 | 7/1997 |
| WO | WO 98/46007 A1 | 10/1998 |
| WO | WO 00/17810 A1 | 3/2000 |
| WO | WO 00/45608 A1 | 8/2000 |
| WO | WO 02/44788 A1 | 6/2002 |
| WO | WO 02/056055 A2 | 7/2002 |
| WO | WO 02/056061 A2 | 7/2002 |
| WO | WO 03/017000 A1 | 2/2003 |
| WO | WO 2004/102958 A1 | 11/2004 |
| WO | WO 2006/125975 | 11/2006 |
| WO | WO 2007/045875 A1 | 4/2007 |
| WO | WO 2007/047732 A2 | 4/2007 |
| WO | WO 2007/054769 A2 | 5/2007 |
| WO | WO 2007/091051 A1 | 8/2007 |
| WO | WO 2007/121417 A2 | 10/2007 |
| WO | WO 2008/108840 A1 | 9/2008 |
| WO | WO 2008/128625 A2 | 10/2008 |
| WO | WO 2008/142543 A1 | 11/2008 |

OTHER PUBLICATIONS

M. Bertero & P. Boccacci, "Introduction to Inverse Problems in Imaging," Institute of Physics Publishing, 1998, p. 106-113; 174-183; 288-294.

Feb. 25, 2011 Office Action issued in U.S. Appl. No. 12/278,470.

Meng et al. "A Gamma Ray Imager Using Clustered Non-Redundant Array Coded Aperture," 2003 IEEE Nuclear Science Symposium Conference Record, vol. 2 (Oct. 2003), pp. 763-766.

U.S. Appl. No. 60/792,335, filed Oct. 17, 2005 in the name of David Brady.

Mar. 29, 2010 Office Action issued in U.S. Appl. No. 12/278,470.

Cannon et al., "Coded Aperture Imaging: Many Holes Make Light Work," Optical Engineering, May/Jun. 1980, vol. 19, No. 3, pp. 283-289, (XP-001092857).

De Villiers et al., "Sub-Pixel Super-Resolution by Decoding Frames from a Reconfigurable Coded-Aperture Camera: Theory and Experimental Verification," Proc. of SPIE, 2009, vol. 7468, pp. 746806-1 to 746806-9, (XP-002558345).

Gutin et al., "Agile, Detecting and Discriminating, infrared Electooptical System (ADDIOS) Application to Coded Aperture Imaging and Non-Imaging Sensor Systems," Proc. of SPIE, 2007, vol. 6714, pp. 671406-1 to 671406-12, (XP-002558346).

Mohan et al., "Sensing Increased Image Resolution Using Aperture Masks," CVPR, 2008, pp. 1-8, (XP-31297391).

Slinger et al., "Coded Aperture Systems as Nonconventional, Lensless Imagers for the Visible and Infrared," Proc. of SPIE, 2007, vol. 6737, pp. 67370D-1 to 67370D-10, (XP-002558347).

Rocchia et al., "A Multiplex Imaging Spectrometer for Low Energy X-Ray Astronomy," Astrophysics and Space Science, Oct. 1983, vol. 96, No. 2, pp. 361-374.

Grindlay et al., "Optimizing Wide-Field Coded Aperture Imaging: Radial Mask Holes and Scanning," Proc. of SPIE, 2004, vol. 5168, No. 1, pp. 402-410, San Diego, CA, USA, Aug. 4-7, 2003.
Dec. 23, 2009 International Search Report issued in corresponding International Application No. PCT/GB2009/001870.
Mar. 5, 2010 International Search Report issued in corresponding International Application No. PCT/GB2009/002780.
Mar. 19, 2009 Office Action issued in corresponding Application No. GB0822281.2.
Feb. 23, 2010 Office Action issued in U.S. Appl. No. 12/278,528.
Mar. 11, 2010 Office Action issued in U.S. Appl. No. 12/278,521.
Nov. 18, 2009 Office Action issued in U.S. Appl. No. 11/920,345.
May 7, 2010 Office Action issued in U.S. Appl. No. 11/920,345.
Sep. 14, 2010 Office Action issued in Japanese Patent Application No. 2008-512909 (translation).
Ivanov, O.P., "Control and image decoding software for portable gamma-ray imaging system with coded aperture", Oct. 1999, Nuclear Science Symposium 1999. Conference Record. 1999 IEEE, vol. 1, pp. 459-463.
Aug. 26, 2009 Office Action issued in U.S. Appl. No. 12/278,528.
Sep. 30, 2010 Office Action issued in U.S. Appl. No. 12/278,470.
Oct. 19, 2010 Office Action issued in U.S. Appl. No. 12/278,500.
Aug. 31, 2010 Office Action issued in U.S. Appl. No. 12/278,528.
Fenimore et al.; "Coded aperture imaging with uniformly redundant arrays"; *Applied Optics*; Feb. 1, 1978; pp. 337-347; vol. 17, No. 3; Optical Society of America.
Cannon et al.; "Tomographical imaging using uniformly redundant arrays"; *Applied Optics*; Apr. 1, 1979; pp. 1052-1057; vol. 18, No. 7; Optical Society of America.
Busboom et al.; "Coded aperture imaging with multiple measurements"; *J. Opt. Soc. Am. A*; May 1997; pp. 1058-1065 vol. 14, No. 5; Optical Society of America.
Bertero et al.; "Image restoration methods for the Large Binocular Telescope (LBT)"; *Astronomy and Astrophysics*; May 30, 2000; pp. 1-15.
De Villiers et al.; "Positive solutions to linear inverse problems"; *Inverse Problems*; 1999; pp. 615-635; vol. 15; IOP Publishing Ltd.
Fish et al.; "Scanning singular-value-decomposition method for restoration of images with space-variant blur"; *J. Opt. Soc. Am. A*; Mar. 1996; pp. 464-469; vol. 13, No. 3; Optical Society of America.
Tam et al.; "Spatial-light-modulator-based electro-optical imaging system"; *Applied Optics*; Feb. 10, 1992; pp. 578-580; vol. 31, No. 5; Optical Society of America.
Sun et al.; "Method for reduction of background artifacts of images in scanning holography with a Fresnel-zone-plate coded aperture"; *Applied Optics*; Jul. 20, 2004; pp. 4214-4218; vol. 43, No. 21; Optical Society of America.
International Search Report for PCT/GB2006/001890 mailed Aug. 28, 2006.
GB Search Reports for Application No. 0510470.8 dated Aug. 16, 2005, Nov. 8, 2005 and Nov. 10, 2005.
Schaich et al., "Computer Vision for Detecting and Quantifying Gamma-Ray Sources in Coded-Aperture Images," Record of the Asilomar Conference on Signals, Systems and Computers, Oct. 30, 1994, vol. 1, Conf. 28, pp. 741-748, (XP 000533631).
Casasent et al., "Real-time deformation invariant optical pattern recognition using coordinate transformations," *Applied Optics*, Mar. 1, 1987, pp. 938-942, vol. 26, No. 5, Optical Society of America, (XP 000601745).

Gmar et al., "Development of Coded-Aperture Imaging With a Compact Gamma Camera," *IEEE Transactions on Nuclear Science*, Aug. 2004, pp. 1682-1687, vol. 51, No. 4, IEEE, (XP 002366988).
Mertz et al., "Fresnel Transformations of Images," *Proceedings of the Conference on Optical Instruments and Techniques*, London 1961, Ed. K.J. Habel, 1961, pp. 305-312, (XP 002432814).
Graziani at al., "Localization of GRBs by Bayesian Analysis of Data from the HETE WXM," AIP Conference Proceedings AIP USA, 2003, No. 662, (XP 002467862).
Graziani et al., "Determination of X-Ray Transient Source Positions by Bayesian Analysis of Coded Aperture Data," Oct. 8, 1997, pp. 1-6, (XP 002467863).
Gopinathan et al., "Coded apertures for efficient pyroelectric motion tracking," *Optics Express*, Sep. 8, 2003, vol. 11, No. 18, pp. 2142-2152, (XP 002467864).
Goossen et al., "Silicon Modulator Based on Mechanically-Active Anti-Reflection Layer with 1 Mbit/sec Capability for Fiber-in-the-loop Applications," *IEEE: Photonics Technology Letters*, Sep. 1994, pp. 1119-1121, vol. 6, No. 9, IEEE, (XP 000468079).
Accorsi et al., "High-Sensitivity Dynamic Coded Aperture Imaging," *2003 IEEE Nuclear Science Symposium Conference Record*, vol. 5 of 5, Oct. 19, 2003, pp. 1833-1837, vol. 13, IEEE.
Brown, "Multiplex imaging with multiple-pinhole cameras," *Journal of Applied Physics*., Apr. 1974, pp. 1806-1811, vol. 45, No. 4, American Institute of Physics.
Monnelly et al., "HETE Soft X-ray Camera Imaging: Calibration, Performance, and Sensitivity," *AIP Conference Proc.*, 2003, pp. 49-55, American Institute of Physics.
Wood et al., "Hybrid optics in dual waveband infrared systems," *Proc of. SPIE*, 1998, pp. 602-613, vol. 3482.
Lewis et al., "Micromachined Modulator Arrays for Use in Free-Space Optical Communication Systems," *Advanced Free-Space Optical Communications Techniques and Technologies*, Proc of. SPIE, vol. 5614, pp. 24-30, 2004.
Moseley et al., "Microshutters Arrays for the JWST Near Infrared Spectrograph," *Proceedings SPIE, International Society for Optical Engineering*, 2004, vol. 5487, Part 2, pp. 645-652.
Kutyrev et al., "Programmable Microshutter Arrays for the JWST NIRSpec: Optical Performance," *IEEE Journal of Selected Topics in Quantum Electronics*, May/Jun. 2004, vol. 10, No. 3, pp. 652-661.
U.S. Appl. No. 60/726,655, filed Oct. 17, 2005 in the name of David Brady.
U.S. Appl. No. 12/278,528, filed Aug. 6, 2008 in the name of Douglas Payne.
US. Appl. No. 12/278,515, filed Aug. 6, 2008 in the name of Philip Haskell.
U.S. Appl. No. 12/278,470, filed Aug. 6, 2008 in the name of Christopher Slinger.
U.S. Appl. No. 12/278,500, filed Aug. 6, 2008 in the name of Mark McNie et al.
U.S. Appl. No. 12/278,521, filed Aug. 6, 2008 in the name of Christopher Slinger.
U.S. Appl. No. 12/373,946, filed Jan. 15, 2009 in the name of Malcolm Strens.
Japanese Office Action dated May 24, 2011 for Japanese Patent Application No. 2008-512909.
Jul. 19, 2011 Office Action issued in Japanese Patent Application No. 2008-552892.

* cited by examiner

Box 36

PROCESSING METHODS FOR CODED APERTURE IMAGING

This invention relates to methods for processing image data acquired in a coded imaging system.

Coded aperture imaging is a known imaging technique which is primarily used in high energy imaging such as X-ray or γ-ray imaging where suitable lens materials do not generally exist, see for instance E. Fenimore and T. M. Cannon, "Coded aperture imaging with uniformly redundant arrays", Applied Optics, Vol. 17, No. 3, pages 337-347, 1 Feb. 1978. It has also been proposed for three dimensional imaging, see for instance "Tomographical imaging using uniformly redundant arrays" Cannon T M, Fenimore E E, Applied Optics 18, no. 7, p. 1052-1057 (1979)

Coded aperture imaging exploits the same principles as a pinhole camera but instead of having a single small aperture uses a coded aperture mask having an array of apertures. The small size of the apertures results in a high angular resolution and increasing the number of apertures increases the radiation arriving at the detector thus increasing the signal to noise ratio. Each aperture passes an image of the scene to the detector array and so the pattern at the detector array is an overlapping series of images and is not recognisable as the scene. Processing is needed to reconstruct the original scene image from the recorded data.

The reconstruction process requires knowledge of the aperture array used and system configuration and the aperture array chosen is often coded to allow subsequent good quality image reconstruction. The processing is performed using a mathematical model of the particular array at a set location.

Busboom et al. "Coded aperture imaging with multiple measurements" J. Opt. Soc. Am. A, Vol. 14, No. 5, May 1997 propose a coded aperture imaging technique which takes multiple measurements of the scene, each acquired with a different coded aperture array. Busboom et al. discuss that image reconstruction can be performed using a cross correlation technique and, considering quantum noise of the source, discuss the choice of arrays that maximise the signal to noise ratio.

Conventional coded aperture imaging can be thought of as a geometric imaging technique and for the applications it is usually used for, e.g. astronomy, diffraction is negligible. The technique proposed by Busboom et al. discussed above is not concerned with diffraction and hence the effects of diffraction on image reconstruction are not discussed.

Recently, see our co-pending PCT patent application WO2006/125975, it has been proposed to use a reconfigurable coded aperture imager having a reconfigurable coded aperture mask means. The use of a reconfigurable coded aperture mask means allows different coded aperture masks to be displayed at different times. This allows, for example, the direction and FOV of the imaging system to be altered without requiring any moving parts. Further the resolution of the imaging system can also be altered by changing the coded aperture mask displayed on the coded aperture mask means.

The pattern displayed on the coded aperture mask means is a coded aperture mask and at least part of the coded aperture mask is a coded aperture array. That is either the whole pattern displayed on the mask means is a coded aperture array or only part of the pattern is a coded aperture array. For the avoidance of doubt the term aperture used herein does not imply a physical hole in the mask means but merely an area of the pattern which allows radiation to reach the detector.

WO2006/125975 teaches a versatile and lightweight imaging system that can be rapidly configured to have different fields of view or resolution without any moving parts. It eliminates the need for conventional optics, gives conformal imaging capability, can have an infinite depth of field and gives inherent power free encryption since decoding of the image requires knowledge of the coded aperture array used. The imaging apparatus described therein is particularly suitably for several imaging and surveillance applications in the visible, infrared or ultraviolet wavebands.

However, high resolution imaging requires small aperture sizes and a longer optical path from the detector to the mask, which increases the effects of diffraction. Diffraction causes a blurring of the pattern formed by the mask on the detector array, reducing its modulation and having a corresponding detrimental effect on decoded image quality.

It is therefore an object of the invention to provide a method of processing image data from a coded aperture imaging system which recovers good image quality in the presence of diffraction.

Thus according to the present invention there is provided a method of forming an image from data captured from a coded aperture imaging system comprising the steps of taking a plurality of frames of data recorded by the coded aperture imaging system, each frame of data acquired using a different coded aperture array, taking for each frame of data a decoding pattern corresponding to the coded aperture array used to acquire that frame of data and processing the data to provide a decoded image which is a combined regularized least squares fit to all the frames of data. Preferably the processing incorporates at least one of the constraints that the decoded image must be positive and that the decode imaged should be zero outside of an expected image region.

The method according to the present invention therefore uses data acquired using a plurality of different coded aperture arrays, i.e. a plurality of different mask patterns, and attempts to solve the combined inverse problem for the totality of frames of data and corresponding coded aperture arrays.

The skilled person will appreciate that, in the diffraction free case, the signal recorded at the detector array of a coded aperture imaging system can, for a single frame of data recorded with a particular coded aperture array, be described as a convolution of the scene intensity with the mask pattern, i.e. the decoding pattern, of the coded aperture array plus some noise. For the diffraction free case the decoding pattern corresponds to the pattern of the coded aperture array. The object of all decoding algorithms is therefore to recover the scene image by using knowledge of the mask pattern, for instance by performing a deconvolution or cross correlation.

Where diffraction effects are significant however the intensity pattern at the detector array no longer corresponds directly to the aperture function. Instead the diffraction pattern formed at the detector array is in effect a blurred version of the mask pattern. Diffraction effects prevent an exact deconvolution.

The present inventors have found however that using a plurality of frames of data, each acquired using a different coded aperture array, can significantly increase the quality of the recovered image in the presence of diffraction. The method of the present invention may therefore operate on frames of data which are the recorded intensity pattern, formed on the detector of the coded aperture imagine system, for which diffraction effects are significant. By significant is meant that diffraction causes noticeable spreading of the signal and reduces the modulation of the aperture mask.

In the method of the present invention a plurality of sets of data are obtained, each acquired using a different coded aperture array. The method of the present invention seeks to provide a solution which simultaneously decodes the data for each frame data using its associated decoding pattern. As will be described in more detail later, this can be posed as a least squares problem and a solution to the minimisation problem found. It should noted that the method of present invention does not simply combine data from different frames but instead provides a simultaneous solution to the separate problems represented by each frame of data. The decoding pattern used for each coded aperture array preferably corresponds to the diffraction pattern which is formed by the coded aperture array at the detector at the wavelength(s) of interest. As will be described below the diffraction pattern can be measured at the wavelength(s) of operation or can be calculated based on the aperture pattern.

Diffraction effects mean that the least squares minimisation problem is an ill posed problem and therefore some form of regularization is preferably applied to the least squares fit to produce a sensible solution. One preferred form of regularization is a multi-image form of Tikhonov regularization such as proposed by Bertero and Boccacci: M. Bertero and P. Boccacci—"Image Restoration Methods for the Large Binocular Telescope", Astron. Astrophys. Suppl. Ser. 147, pp. 323-333, 2000. Tikhonov regularisation is a known technique in the solution of inverse problems, see also for example page 108 of "Introduction to Inverse Problems in Imaging, M. Bertero & P. Boccacci, Institute of Physics Publishing, 1998, ISBN 0750304359 (hereinafter referred to as Bertero & Boccacci).

Alternatively a Wiener filter technique could be applied. An iterative technique such as the Landweber iteration could also be used, see page 291 of Bertero & Boccacci.

In order to improve image quality and attempt to overcome diffraction effects the method of the present invention incorporates as much prior information about the solution as possible. Thus the method of the present invention incorporates one or both of the constraints that the image should be positive and that the decoded image should be zero outside an expected region.

Coded aperture imaging is an incoherent imaging technique and the image one is trying to reconstruct is an intensity image. Therefore the true image will not be negative and one can constrain all possible solutions to contain no negative parts. Positively may be incorporated into the solution, for example, using the method described by G D de Villiers, E R Pike and B McNally—"Positive solutions to linear inverse problems", Inverse Problems, 15, 1999 pp. 615-635.

Conveniently however positivity may be incorporated into the solution using a variant of the Landweber iteration as this is potentially easier to implement (see Bertero and Boccacci, page 291). In this case the method may involve using a projection operator onto the set of functions which is one for all parts of the solution which are positive and zero for all parts of the solution which are negative. In other words only the positive parts of the solution to one iteration are used in the next iteration. Note that the Richardson-Lucy method (also known as the Expectation Maximization method) has similar performance to the projected Landweber method though it is computationally more intensive (Bertero and Boccacci, page 179).

As mentioned above, in the absence of diffraction, coded aperture imaging can be thought of as a geometric imaging technique. Therefore, given a knowledge of the size and spacing of the coded aperture array in the coded aperture imaging system, one knows in advance the expected size and location of the image after it has been decoded. Diffraction effectively causes spreading of the data outside the expected region. The true image should be entirely located within the expected region and hence, ideally, there would be no image outside of this expected region. Therefore a further constraint is that the solution, i.e. the decoded image, must be zero outside an expected region, or in other words the decoded image must have a certain finite support.

The support for the solution, i.e. the constraint that the decoded image must be zero outside an expected region, may also be incorporated into the method of the present invention by using a variant of the Landweber iteration by using a projection operator on the set of functions which is one for all areas within the expected region and zero for all areas outside the region.

If one assumes that the degree of blurring is constant across the image the evaluation step of the Landweber iteration may be performed in the frequency domain as this speeds processing. However to enforce positivity and support for the image one needs to work in the spatial domain. The skilled person will be well aware that one can apply a Fourier transform to the constrained solution to switch to the frequency domain, solve for the new iteration and then apply an inverse Fourier transform to return to the spatial domain.

In an especially preferred method of the present invention therefore the step of processing the data to provide an image solution which is least squares fit to the data from each frame of data comprises an initial step of forming a first estimate of the image solution, and then an iterative improvement step incorporating the constraints that the solution, i.e. the decoded image must be positive and that the solution must be bounded in an expected image region, i.e. that the decoded image should be zero outside of the expected region. The iterative step preferably applies the Landweber interation.

The method of the present invention therefore provides a method of reconstructing good quality images using several different frames of data even when diffraction effects are significant. The method may therefore be used to form images from data acquired in the visible, ultraviolet or infrared spectra where diffraction effects may be significant.

The method may be applied real time using the current frame of data and at least one previous frame of data or it may be applied off line to data previously acquired.

The number of frames of data which are used in the least squares fit may depend on the particular application and in particular on how quickly frames are captured and the evolution of the scene. The method of the present invention is based on the several frames of data being of substantially the same scene. If the scene is changing rapidly or the data is acquired when the coded aperture system is moving rapidly with respect to the scene there may be a limit to how many frames can be combined and still relate to essentially the same scene.

For a static scene combining ten frames or so of data has been found to give good improvement in image quality compared to processing a single frame of data only. The more frames of data corresponding to the same scene that one uses will generally improve image quality but will also increase the processing overhead. Processing m+1 frames will give improved image quality over using m frames but with decreasingly significance as m increases. However the processing load will continue to increase with m and so there will be an optimal number of frames depending on the application. The skilled person will be able to determine the optimal number of frames for a particular application which may be approximately 5 or 10 or 15 or 20 or 25 frames of data or more.

The method of the present invention, as described above, therefore provides benefits compared with processing a single frame of data in producing clearer images and helps overcome diffraction effects. In an embodiment of the invention the data may be further processed to provide further image enhancement. The multiple frame approach described above may therefore form part of an overall method of processing data acquired from a coded aperture imaging apparatus. Such an overall method may take a plurality of frames of data and process each to form an initial image before subsequently performing at least one image enhancement step using the plurality of initial images. The data is processed to form an image for each frame prior to applying the least squares fit.

Each blurred initial image can be seen as the true image convolved with a point spread function. The step of image enhancement is then to recover the true image.

As the skilled person will appreciate the point spread function may vary across the image. The method may therefore involve the step of dividing the each initial image into a series of image regions over which the point spread function is relatively invariant prior to performing the lest squares fit on these image regions to improve quality. Dividing the image into a plurality of small image areas not only ensures that the point spread function is spatially invariant for that area but it also eases the computation as compared with attempting to process the entire image. In processing each small image region the data from each initial image corresponding to that particular region is processed together. Thus the method as described above, using a plurality of different frames of data, is performed separately for each small image region.

The initial image can be formed for each frame of data in a variety of ways but preferably a simple cross correlation is performed for the single frame of data using a decoding pattern appropriate to the coded aperture array used to capture the data. This is the conventional approach to image decoding in coded aperture imaging except that in the presence of diffraction one uses the diffraction pattern of the coded aperture array.

The initial image is therefore decoded using a particular decoding pattern for the whole image. As mentioned above, the decoding pattern corresponds to the diffraction pattern caused by the mask at the wavelength of operation. The skilled person will appreciate however that a point source located at one part of the scene would lead to a different diffraction pattern being formed compared to the same point source located at a different part of the scene. In other words the decoding pattern used in forming the initial image may only be the correct function for part of the scene and hence other parts of the initial image may be blurred due to use of a decoding pattern which is slightly different to the actual decoding pattern that corresponds to that part of the scene. The least squares fit for each image region preferably therefore uses a decoding pattern optimised for that region of the image.

The decoding pattern appropriate to each region could be recorded by imaging a point source having the appropriate spectral characteristics in different regions of the scene and recording the intensity pattern on the detector array for each part of the scene. Our co-pending patent application GB0602373 teaches various methods by which the appropriate decoding pattern could be recorded. Alternatively the decoding pattern for each image region could be calculated.

Preferably the step of processing each image region, the least squares fit, involves a Tikhonov regularization. Preferably the step of processing each image region also incorporates the constraint that the solution should be positive.

Processing discrete image regions could lead to image artifacts at the edge of adjacent regions. Therefore preferably a first image region is taken and processed. However only the values of the reconstruction, i.e. decoded image formed by the least squares fit, at the centre of this region are stored. The region is then moved by a few pixels (so that the second image region overlaps with the first image region) and the process is repeated. This avoids any image artifacts being created.

The present invention therefore can be implemented as a two stage process. Thus in another aspect of the invention there is provided a method of forming an image from data captured from a coded aperture imaging array comprising the steps of taking a plurality of frames of data, each frame of data acquired using a different coded aperture array, taking for each frame of data a decoding pattern corresponding to the appropriate coded aperture array and processing the data to provide a first image solution for each frame of data and then deblurring the plurality of first image solutions using a set of deblurring functions derived from a set of decoding patterns each optimised for different regions of the image. Preferably the step of deblurring the first image solution incorporates the constraint that the solution must be positive.

It should be noted that whilst the present invention relates to use of multiple mask images the step of dividing a first image solution into a series of sub-images and processing each separately can be advantageously applied even with only a single frame of data. In this case a single frame of data could be processed to form a first image solution using a particular decoding pattern and then divided into a plurality of image regions, each image region being processed separately using a decoding pattern optimised for that image region. This processing of the separate image regions with optimised decoding patterns improves the quality of the image as compared with the first image solution.

It would therefore be possible to perform a method of forming an image from data recorded by a coded aperture imaging system wherein the method comprises the step of dividing the image into a plurality of smaller image regions and processing each small image region separately using a decoding pattern optimised for that image region. In effect one could solve the inverse problem separately for each image region.

Solving the inverse problem for each image region can proceed using the method outlined above, i.e. the initial solution can be solved with a Tikhonov regularisation using Fourier methods. Alternatively a truncated singular function expansion could be used as proposed in "Scanning singular-value decomposition method for restoration of images with space-variant blur", D A Fish, J Grochmalicki and E R Pike, J. Opt. Soc. Am A, 13, no. 3 1996, pp 464-469. This is a more computationally intense method that Tikhonov regularisation. This method requires calculation of the singular value decomposition (SVD) associated with the point-spread function. However if the point-spread function is spatially invariant then the SVD just needs to be calculated once for treating the entire image. Again one would preferably process a plurality of overlapping small image regions to form a solution for each region and would retain the values for the particular solution at the centre of each region only so as to avoid any edge artifacts.

In general other prior information about the scene or targets in the scene can be incorporated into the method of processing the data to form an image. For instance, where one has prior knowledge that the image has a small number of point targets the method may involve an image enhancement step may that uses super-resolution methods involving curve-fitting.

Further, if the coded aperture imager is to be used for tracking then high-resolution patches may only be needed where tracking is being carried out. This would cut the computational load significantly. Therefore the method may perform image enhancement only at parts of interest of the image, i.e. moving parts of the scene or areas of possible or confirmed targets.

Where the coded aperture imager is used for target tracking information from more than one image can also be combined in a track-before-detect scheme. Track Before Detect algorithms have been previously used in the radar and sonar fields and use data from several acquisitions of data from the sensor together to improve target identification. A similar approach could be used to different images from a coded aperture imaging system.

The foregoing description has described the invention in terms of a method only. However the present invention also allows a novel coded aperture imaging system. Hence, in another aspect of the invention there is provided a coded aperture imaging system comprising a detector array arranged to image a scene through a reconfigurable coded aperture mask means and a processor, wherein the reconfigurable coded aperture mask means is adapted to provide a plurality of different coded aperture arrays in series and the processor records the signal from the detector array for each different coded aperture array and applies the method as described above to form an image.

The present invention will now be described by way of example only with respect to the following drawing of which.

Coded aperture imaging (CAI) is based on the same principles as a pinhole camera. In a pinhole camera, images free from chromatic aberration are formed at all distances away from the pinhole, allowing the prospect of more compact imaging systems, with a much larger depth of field. However, the major penalty is the poor intensity throughput, which results from the small light gathering characteristics of the pinhole. Nevertheless, the camera is still able to produce images with a resolution determined by the diameter of the pinhole, although diffraction effects have to be considered. The light throughput of the system can be increased by several orders of magnitude, while preserving angular resolution, by using an array of pinholes. Each detector element sees the result of the summation of contributions from the various pinholes, corresponding to each viewpoint of the scene.

Another way of understanding the operating principle of conventional CAI is to observe that this is a purely geometric imaging technique. Light from every point in a scene within the field of regard (FOR) of the system casts a shadow of the coded aperture onto the detector array. The detector measures the intensity sum of these shadows. The coded aperture is specially designed such that its autocorrelation function is sharp with very low sidelobes. Typically pseudorandom or uniformly redundant arrays (URA) (such as described in E. Fenimore and T. M. Cannon, "Coded aperture imaging with uniformly redundant arrays", Applied Optics, Vol. 17, No. 3, pages 337-347, 1 Feb. 1978) are used where a deconvolution or decorrelation of the detector intensity pattern can yield a good approximation to the point distribution in the scene.

Previous CAI systems have generally been employed in application where diffraction effects are minimal. For instance coded aperture imaging has often been used in astronomical imaging. However, for some applications of coded aperture imaging techniques, it is necessary to improve the angular resolution significantly. This can be especially true when operating in the visible, infrared or ultraviolet wavebands say, or in other wavebands requiring high resolution imagery. Assuming that the detector pixels are smaller than the feature size of the coded aperture array, p, the angular resolution is determined by $\tan^{-1}(p/s)$ where s is the optical distance between the mask and the detector array. Therefore increasing the resolution of the imager requires either decreasing the size of the apertures or increasing the mask to detector distance or both. With relatively small apertures and/or large mask to detector distances, diffractive effects start to become significant. The blurring effects of diffraction mean that the pattern projected onto the detector array is effectively smeared, reducing image quality.

Figure 1:
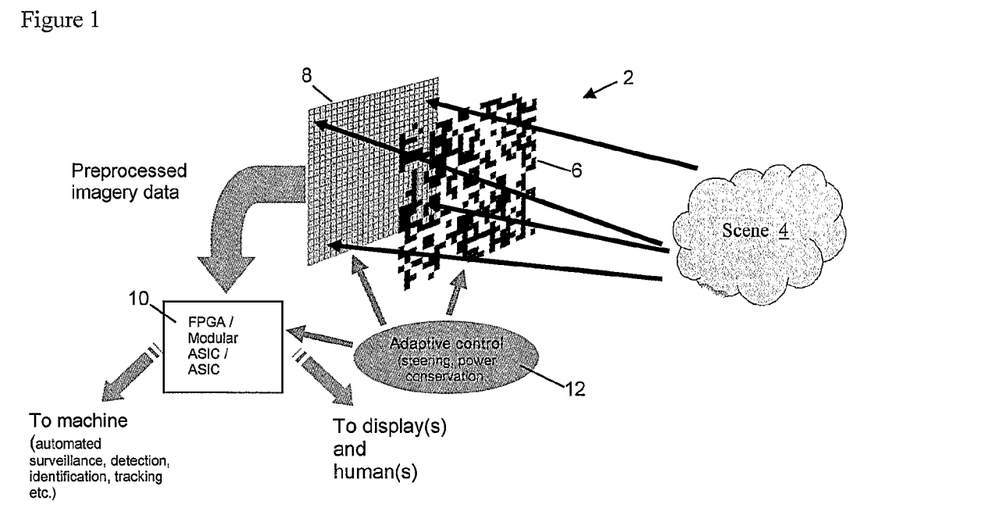
FIG. 1 shows schematically a coded imaging system of the present invention.

FIG. 1 shows schematically an example of a coded aperture imaging system, generally indicated 2. Rays of light from points in the scene 4 fall onto a particular coded aperture array 6. The coded aperture array acts as a shadow mask and therefore a series of overlapping coded images are produced on the detector array 8. At each pixel on the detector array, the intensities from the overlapping, coded images are summed. The output from the detector array 8 is passed to a processor 10 where image of the scene can be subsequently decoded from the detector signals using a variety of digital signal processing techniques.

Recently WO2006/125975 has proposed using a reconfigurable mask means 6 to provide a reconfigurable coded aperture array. The coded aperture mask means 6 is controlled by a controller 12 which controls the reconfigurable mask means to display different coded aperture masks. If only part of the coded aperture mask means displays a coded aperture array, the rest of the mask preventing radiation from reaching the detector, then the field of view of the apparatus is determined by the location and size of the coded aperture array relative to the detector, changing its position or size changes the field of view and/or resolution of the imager.

CAI therefore offers the ability to provide a compact and lightweight imaging apparatus which has a large depth of field and has a changeable field of view without requiring any moving parts.

As mentioned above the intensity pattern formed at the detector array 8 is a series of overlapping images of the scene created by the various apertures. This intensity pattern requires decoding to construct a recognisable image of the scene.

Figure 4:
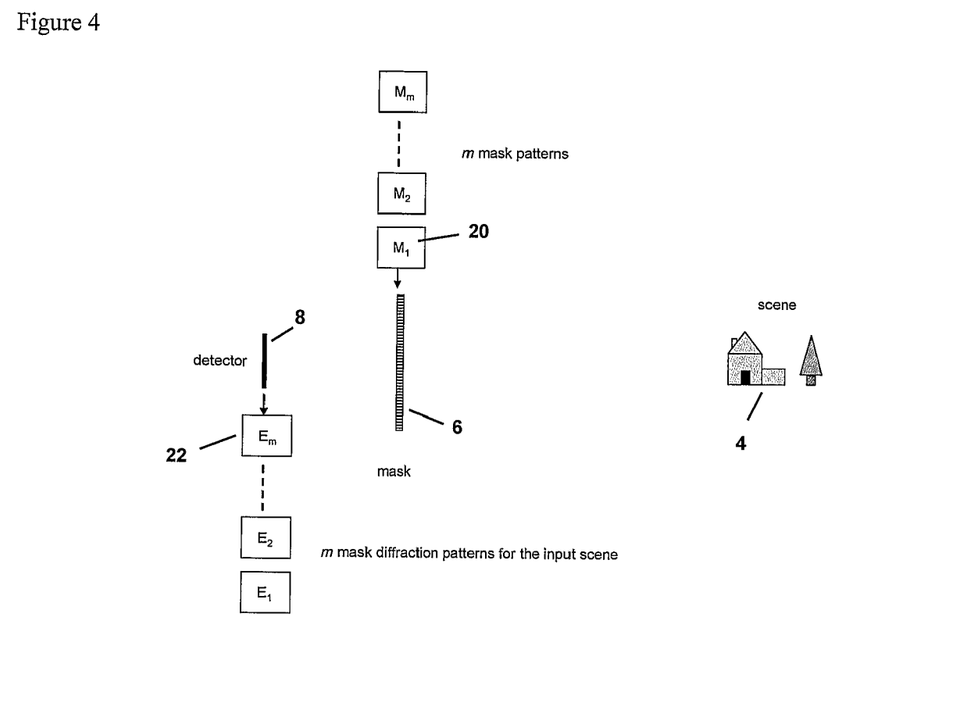
FIG. 4 illustrates acquiring a plurality of frames of data using a coded aperture imager.

FIG. 4 illustrates the capture of multiple frames of data. Reconfigurable coded aperture mask means 6 is sequentially configured to provide a series of coded aperture masks 20 and the output 22 of the detector array 8 is recorded for each coded aperture mask displayed.

For a single mask pattern the basic equation relating the recorded data to the desired scene is $$g = Af + \text{noise} \qquad \text{eqn (1)}$$

where g is the recorded data, A is a linear operator containing the diffraction pattern of the mask and f is the desired scene. The camera will only record intensities so, for the case of narrowband radiation, A will represent the modulus squared of the diffraction pattern of the mask, as recorded on the detector array, and the operator A will be a convolution operator. At this stage it is assumed that the detected radiation is narrowband, for instance, as would be the case using a narrowband detector or applying a narrow band filter.

The multi-mask approach involves decoding simultaneously sets of data corresponding to different mask configurations, e.g. $M_1$-$M_4$. We are required to simultaneously solve for f a set of operator equations of the form:

$$A_j f = g_j, j=1, \ldots, p \qquad \text{eqn (2)}$$

where p is the number of different mask configurations used. This can be phrased as a least-squares problem, as described in M. Bertero and P. Boccacci—"Image Restoration Methods for the Large Binocular Telescope", Astron. Astrophys. Suppl. Ser. 147, pp. 323-333, 2000. where one seeks to minimise over f the discrepancy functional $$\varepsilon^2(f) = \sum_{j=1}^{p} \|A_j f - g_j\|^2 \qquad \text{eqn (3)}$$

The solution to this minimisation problem, f, will satisfy the normal equation:

$$\sum_{j=1}^{p} A_j^T A_j f = \sum_{j=1}^{p} A_j^T g_j \qquad \text{eqn (4)}$$

Now noting that the operators $A_j$ (at least for the narrowband problem) are convolution operators we can take the two-dimensional DFT of both sides of this equation to yield $$\sum_{j=1}^{p} |\hat{A}_j(\omega)|^2 \hat{f}(\omega) = \sum_{j=1}^{p} \hat{A}_j^T(\omega) \hat{g}_j(\omega) \qquad \text{eqn (5)}$$

where $\hat{A}_j^T(\omega)$ is the conjugate of the Fourier transform of the diffraction pattern of the jth mask and $\hat{g}_j(\omega)$ is the Fourier transform of the data corresponding to the jth mask. This is the key equation one needs to solve.

In the presence of diffraction solution of the basic equation is an ill-posed inverse problem and some form of regularisation is necessary to produce a sensible solution. One possibility is a multi-image form of Tikhonov regularisation (Bertero and Boccacci, 2000, equation 13).

In the Fourier domain the Tikhonov solution takes the form $$\hat{f}(\omega) = \sum_{j=1}^{p} \frac{\hat{A}_j^T(\omega)}{|\hat{A}(\omega)|^2 + \mu} \hat{g}_j(\omega) \qquad \text{eqn (6)}$$

where μ is the regularisation parameter and $$|\hat{A}(\omega)|^2 = \sum_{j=1}^{p} |\hat{A}_j(\omega)|^2 \qquad \text{eqn (7)}$$

This solution does not take into account the prior knowledge that the solution must be non-negative and must have a certain, finite, support, i.e. one knows where the image is expected to be in image space. A simple way of doing this is to modify the usual Landweber iteration.

The method described here is a modified version of the Landweber iteration given in eqn (17) in M. Bertero and P. Boccacci—"Image Restoration Methods for the Large Binocular Telescope", Astron. Astrophys. Suppl. Ser. 147, pp. 323-333, 2000. The modification is necessary in order to incorporate into the problem knowledge of the support of the image.

The iteration takes the form $$f_+^{k+1} = P_+ \left\{ f_+^k + \tau \sum_{j=1}^{p} (A_j^T g_j - A_j^T A_j f_+^k) \right\} \qquad \text{eqn (7)}$$

Here k is the iteration number and τ is the relaxation parameter. The + subscript on f indicates that the eventual solution will be non-negative. $P_+$ is the projection operator onto the set of non-negative functions, defined by $$(P_+ f)(x) = \begin{cases} f(x), & f(x) \geq 0 \\ 0, & f(x) < 0 \end{cases} \qquad \text{eqn (8)}$$

In addition to this projection, the projection onto the set of functions with a given support S, i.e. the expected part of image space where the image will be formed, needs to be carried out. This is accomplished using the projection operator $P_S$ defined by $$(P_S f)(x) = \begin{cases} f(x), & x \in S \\ 0, & x \notin S \end{cases} \qquad \text{eqn (9)}$$

For the problem in hand, due to the size of the images, it is much easier to carry out the convolutions in the Fourier domain. The iteration would then proceed by swapping between the spatial domain and the Fourier domain, with the projection onto the set of non-negative functions and the projection onto the set of images with a certain support being carried out in the spatial domain.

The method of the present invention therefore generally proceeds as follows. First an the initial estimate of the solution is constructed using multi-image Tikhonov regularisation (equation 6 above). This result is then projected onto the set of images with a given support (i.e. set all elements of the image outside the known region of interest to zero).

It should be noted that the outcome of the solution to the Tikhonov regulation is not constrained to be negative and generally will have significant negative as well as positive parts. One could simply set any negative parts of this solution to zero and progress using the positive parts. However it has been found that applying such a technique and then performing the iteration described above to a greyscale image, as the iteration progressed, the shadows on the image tended to increase in size, giving an unnatural appearance to the image. It was determined that this is due to the taking of the positive part of an initial image which has significant negative parts. The present inventors have found that with this type of starting point once the negative regions on the initial image have been set equal to zero they tend, as the iteration proceeds, to remain zero which can distort the final solution.

Since the initial image for the iteration stage does not need to agree accurately with the data (the agreement being reached through the iteration) one can shift the initial image to make it non-negative. This seems to give very beneficial results. Therefore a data shift is applied to this initial solution to create a solution which is entirely positive and this is stored as the initial $f_{new}$. The data shift is in effect a simple addition to each pixel of a value which makes every pixel non-negative.

Having thus established an initial solution $f_{new}$ the main iteration is repeated a predetermined number of times, the main iteration comprising the steps of:

(a) Project $f_{new}$ onto the known support using $P_S$ and store the result in $f_{new}$
(b) Take the positive part of $f_{new}$ using $P_+$ and store the result in $f_{new}$
(c) Take the DFT of $f_{new}$, Call this $\hat{f}_{old}$
(d) Evaluate $$\hat{f}_{new}(\omega) = \tau(A^T g)(\omega) + (1 - \tau(A^T A)(\omega))\hat{f}_{old}(\omega) \qquad \text{eqn (10)}$$

where:

$$(A^T g)(\omega) = \sum_{j=1}^{p} \hat{A}_j^T(\omega)\hat{g}_j(\omega) \qquad \text{eqn (11)}$$

and $$(A^T A)(\omega) = \sum_{j=1}^{p} |\hat{A}_j(\omega)|^2. \qquad \text{eqn (12)}$$

(e) Take the inverse DFT of $\hat{f}_{new}$:

$$f_{new} = F^{-1}(\hat{f}_{new}) \qquad \text{eqn (13)}$$

The relaxation parameter $\tau$ is chosen to satisfy $$0 < \tau < \frac{2}{\hat{A}_{max}^2} \qquad \text{eqn (14)}$$

where $$\hat{A}_{max}^2 = \max_{\omega} \sum_{j=1}^{p} \hat{A}_j^T(\omega) \cdot \hat{A}_j(\omega) \qquad \text{eqn (15)}$$

The iteration described above has been used on various data sets and a relaxation parameter of;

$$\tau = \frac{1.8}{\hat{A}_{max}^2} \qquad \text{eqn (16)}$$

has been found to give good results.

As mentioned above the method described above has been derived based on the assumption of narrow band radiation. The method can also be used in a broad band situation if the spectrum of radiation from each point in the scene is the same as at any other point. In this case the problem simplifies back to a convolution equation and hence the previous mathematics can still be used. The basic equation in the spatial domain can be written as $$g(y) = \iint K_\lambda(y-x) f(\lambda,x) dx d\lambda \qquad \text{eqn (17)}$$

where $K_\lambda(x)$ is the diffraction pattern of the mask at wavelength $\lambda$. If one assumes that the spectrum of light coming from any point of the scene is the same as that at any other point then one may write $$f(\lambda,x) = h(\lambda) f(x) \qquad \text{eqn (18)}$$

Interchanging the order of integration in eqn (17) then yields $$g(y) = \int \left[ \int K_\lambda(y-x) h(\lambda) d\lambda \right] f(x) dx \qquad \text{eqn (19)}$$

The term in brackets is still a function of (y-x). If one denotes this function by $\tilde{K}(y-x)$ then one has:

$$g(y) = \int \tilde{K}(y-x) f(x) dx \qquad \text{eqn (20)}$$

This is still a convolution equation and so the methods devised for the narrowband convolution problem can all be used as they stand. The only difference is that one must use the broadband point-spread function $\tilde{K}$ instead of $K_\lambda$.

Figures 9, 9A, 9B:
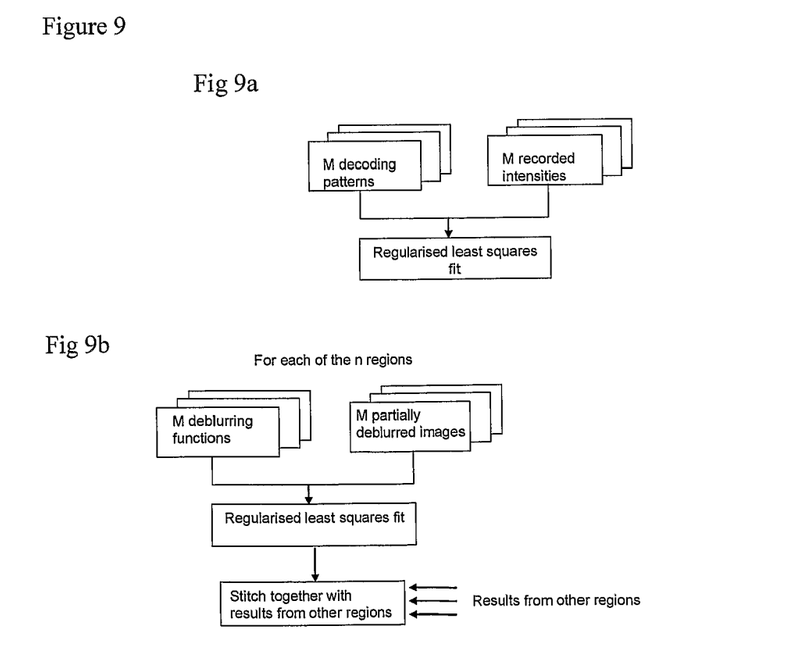
FIG. 9 illustrates how the method of the present invention operates a) in the case of processing a whole image and b) in processing separate image regions.

FIG. 9a illustrates the principles of the invention. For each frame of data 22 is taken an appropriate decoding pattern 24 which are then processed, step 26, using the method described above to yield an image. The decoding patterns may be calculated for each mask pattern or, as shown in FIG. 2, could be actually measured by the coded aperture imaging system.

Figure 2:
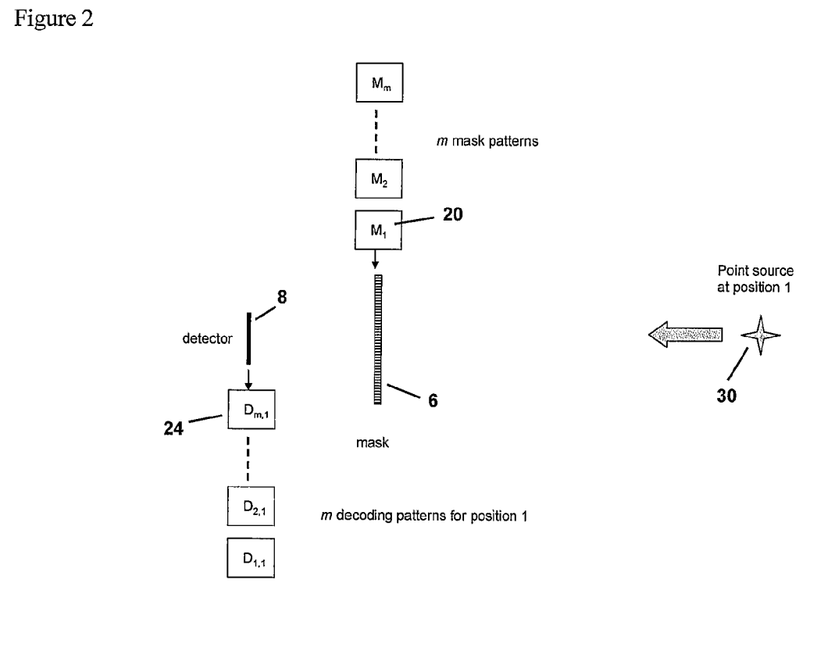
FIG. 2 illustrates how a decoding pattern for each coded aperture can be recorded.

As shown in FIG. 2 a point source 30 may be located in the field of view of the imager. The point source is chosen to match the expected spectral characteristics of the scene so that it forms an appropriate diffraction pattern. The output from the detector array for each coded aperture mask 20 is recorded and represents the decoding pattern 24 for that mask.

The present invention therefore uses a plurality of frames of data to form an image which is clearer than could be formed using a single frame of data alone. In another embodiment of the invention however further clarity can be obtained though by processing to account for local blurring across the image.

Figure 3:
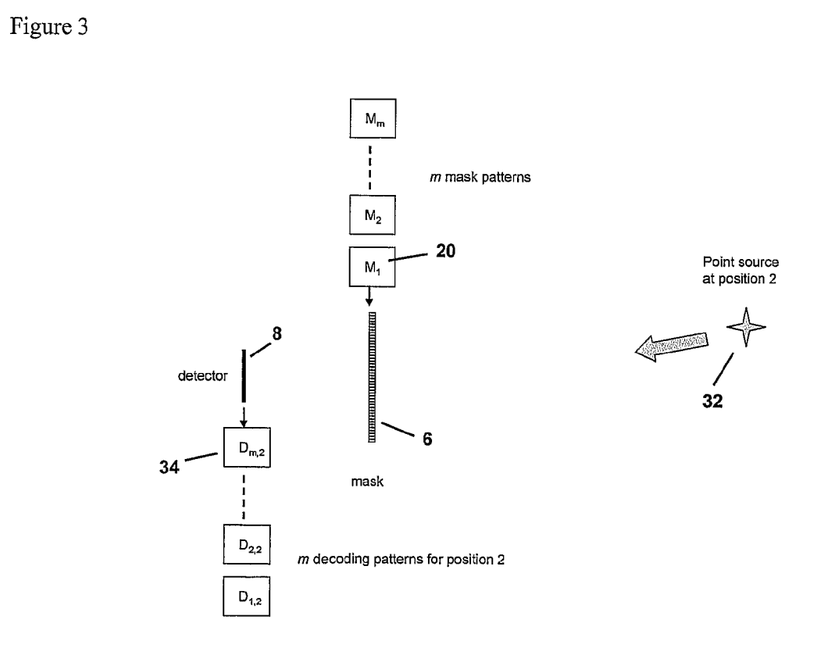
FIG. 3 illustrates recording a decoding pattern for each coded aperture array for a different part of the scene.

In this embodiment a plurality of local deblurring functions, i.e. deblurring functions appropriate for a small image region, are obtained by using a decoding pattern which is optimised for each image region. Again the decoding pattern can be recorded as described above with reference to FIG. 2. FIG. 3 shows a point source located at a different part of the scene. Again the plurality of coded aperture mask patterns 20 are sequentially written to the reconfigurable coded aperture array means and the output of detector array 8 recorded for each coded aperture array. This provides a series of decoding patterns 34 which are optimised for the part of the image which corresponds to the location of point source 32 in the scene. This step is repeated by moving the point source relative to the coded aperture imager so that it appears at a plurality of different positions in the scene, n different positions, and recording a decoding pattern for each coded aperture array for each position.

Having recorded (or calculated) the decoding pattern for each coded aperture array for each position in the scene the coded aperture imager is arranged to view a scene as described above and shown in FIG. 4 and record a plurality of frames of data 22.

Figure 5:
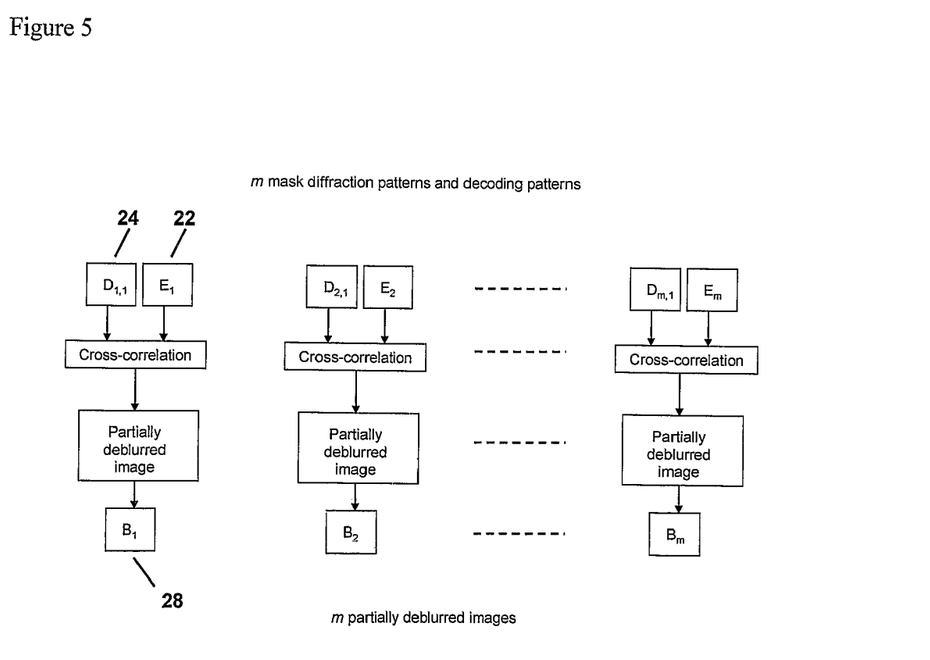
FIG. 5 illustrates the a first stage of processing of the data according to an embodiment of the present invention.

In this embodiment however each frame of data 22 is initially correlated, see FIG. 5, with an appropriate decoding pattern 24 to yield a partially deblurred image 28 for each frame of data. It is convenient to use the set of decoding patterns 24 which correspond to the central image region, i.e. those that would be recorded using a point source which is directly in front of the coded aperture imager (which will be referred to as an on axis point source and the corresponding decoding pattern as an on axis decoding pattern), however the set of decoding patterns corresponding to any one image region could be used. This results in a set of m initial images, each of which is at least partially deblurred but for which the point spread function will vary over the image. The next stage of processing therefore divides each of the m images into n separate image regions, over which the point spread function is spatially invariant, and deblurs each image region separately.

Figure 6:
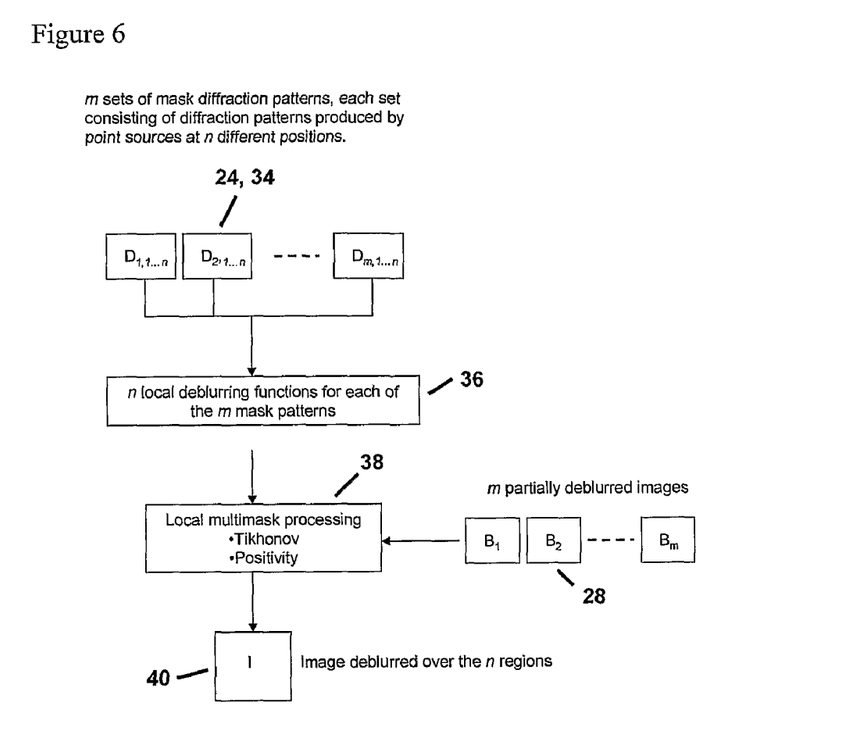
FIG. 6 illustrates a second stage of processing of the data in an embodiment of the invention
Figure 7:
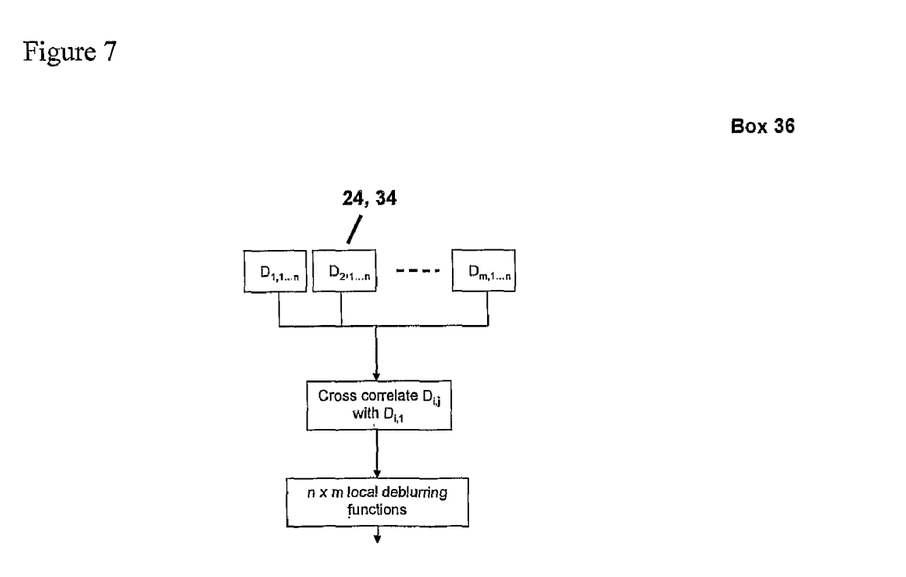
FIG. 7 illustrates in more detail the step of forming a plurality of local deblurring functions as shown in FIG. 6.

Referring now to FIGS. 6 and 7 the whole set of decoding patterns 24, 34 is taken and used to form a set 36 of n local deblurring functions or point spread functions (see FIG. 7), one for each image region. The point spread functions to be deconvolved in this further deblurring step are calculated, as shown in FIG. 7, by forming the cross-correlation of the on-axis decoding pattern (or whatever set of decoding patterns were used to form the initial image) with the decoding pattern for the appropriate image region, for example position 2 shown in FIG. 3.

In other words the off axis point spread functions are calculated by decoding the mask diffraction pattern obtained when the coded aperture imager is illuminated with an off axis point source. The decoding is performed using a decoding pattern derived from the mask diffraction pattern when the system is illuminated with an on axis point source.

Figure 8:
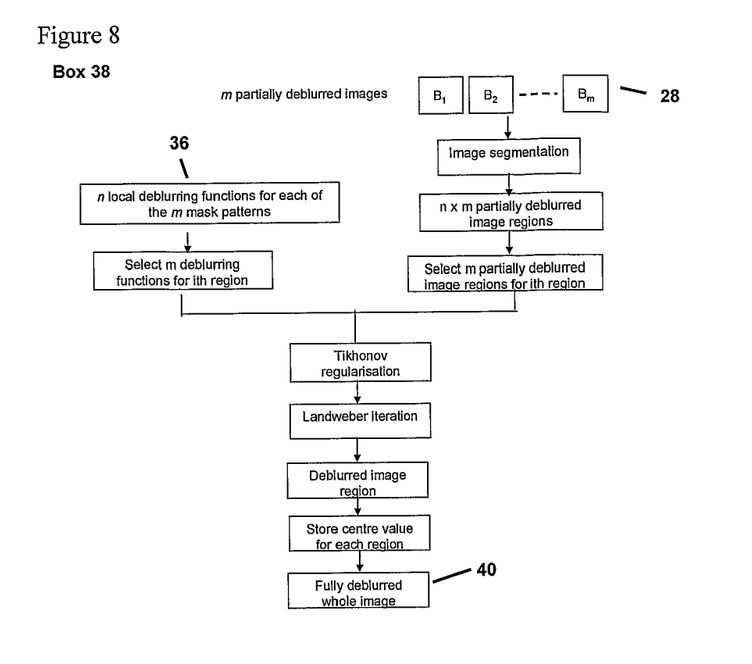
FIG. 8 illustrates in more detail the step of local multimask processing shown in FIG. 6.

Referring now to FIG. 8, the m partially partially deblurred images are passed to an image segmentation algorithm 80. This divides each image into n different image regions. This therefore results in a set of m by n partially deblurred image regions 82.

For each region, in general the ith region 84, the appropriate part of each of the m partially deblurred images is taken along with the corresponding set of local deblurring functions 86.

Thereafter the method as described above can be applied to each image region. In other words a Tikhonov regularisation 38 is applied to the combined problem and then a Landweber iteration performed incorporatinges the constraint that the image must be positive and should be zero in regions of the image that are known to be dark in the scene. This results in a deblurred image for the ith region. The method is repeated for each image region. The n image regions processed overlap and the results of processing for each image are only retained in the centre of the image region to avoid any edge artifacts. This results in a image 40 which is based on the combined frames of data and which is deblurred over the n different image regions.

As mentioned above the same processing is applied to each image region in the embodiment which uses local deblurring functions as is applied in the first embodiment without local deblurring. There is a slight difference in what the inputs to the method are, as illustrated in FIG. 9, but the principle is the same. FIG. 9a shows the inputs for the first embodiment of the invention where the whole image is processed. In this case the inputs are the m intensity patterns as recorded by the detector array and the appropriate m decoding patterns. These are used to form a combined inverse problem which is solved by a regularised least squares fit.

In the second embodiment shown in FIG. 9b, where local deblurring functions are also used, each image region is processed separately. In order to be able to select each image region each frame of data is initially processed to form a first image using, usually, the on axis decoding pattern. The inputs to the multi-frame processing therefore comprise a plurality of sub-images, i.e. the same part of each of the m first images, and also an appropriate deblurring function for each sub-image. The problem to be solved is a deconvolution, exactly as before in the first embodiment and so the skilled person will understand that the same processing method can be applied.

Figure 10A:
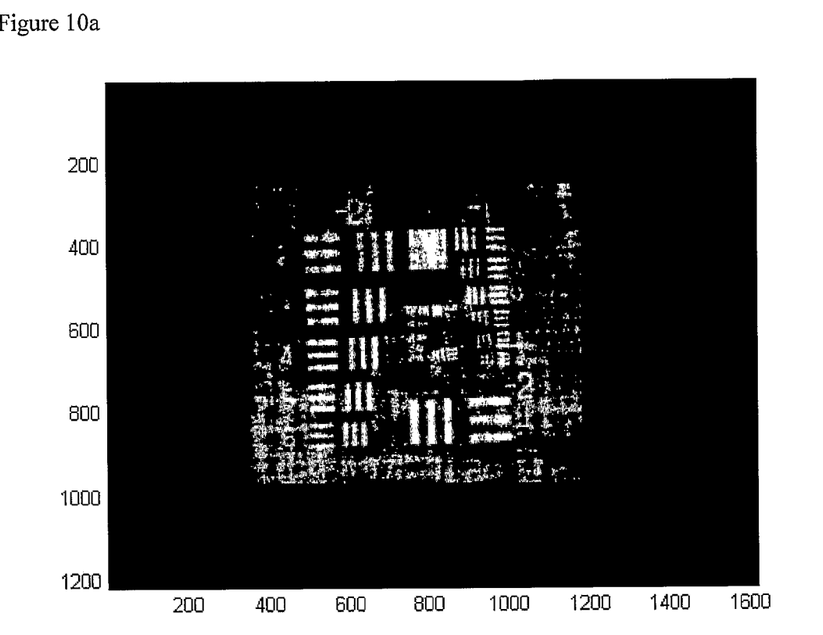
FIG. 10 shows two example processed images.
Figure 10B:
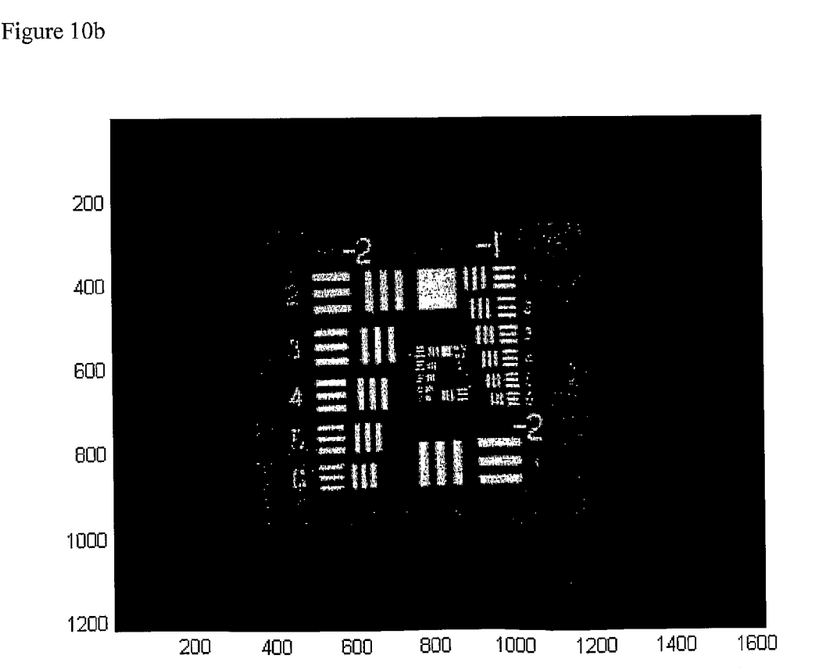

FIGS. 10a and 10b show the improvement due to multimask processing in two processed images of the same test scene which is a standard resolution chart. FIG. 10a shows the processed image using a single mask and Landweber iteration. FIG. 10b shows the final image from multimask processing using eight masks and multimask Landweber iteration. It can be seen that the multimask processing results in a much clearer final image.

The invention claimed is:

1. A method of forming an image from data captured from a coded aperture imaging system comprising the steps of taking a plurality of frames of data recorded by the coded aperture imaging system, each frame of data acquired using a different coded aperture array, taking for each frame of data a decoding pattern corresponding to the coded aperture array used to acquire that frame of data and processing the data to provide an image solution which is a combined regularised least squares fit to all the frames of data.

2. A method of forming an image as claimed in claim 1 wherein the processing incorporates at least one of the constraints that the solution must be positive and that the solution must be zero outside of an expected image region.

3. A method of forming an image as claimed in claim 1 wherein the data recorded by the coded aperture system is an intensity pattern of radiation for which diffraction effects are significant.

4. A method as claimed in claim 1 comprising a multi-image Tikhonov regularization.

5. A method as claimed in claim 1 wherein the step of processing the data incorporates the constraint that the solution is positive using a Landweber iteration.

6. A method as claimed in claim 5 wherein the Landweber iteration applies a projection operator onto the set of functions which is one for all parts of the solution which are positive and zero for all parts of the solution which are negative.

7. A method as claimed in claim 1 wherein the step of processing the data incorporates the constraint that the solution is zero outside an expected image region using a Landweber iteration.

8. A method as claimed in claim 6 wherein the Landweber iteration applies a projection operator onto the set of functions which is one for all areas within the expected image region and zero for all areas outside the expected image region.

9. A method as claimed in claim 5 wherein the evaluation step of the Landweber iteration is performed in the frequency domain and the constraints on the solution are imposed in the spatial domain.

10. A method as claimed in claim 1 wherein the step of processing the data to provide an image solution which is a least squares fit to the data comprises an initial step of forming a first estimate of the image solution, and then an iterative improvement step incorporating the constraints that the solution must be positive and that the solution must be zero outside an expected image region.

11. A method as claimed in claim 10 wherein the iterative step applies the Landweber iteration.

12. A method as claimed in claim 1 comprising an initial step of processing each frame of data to form an initial image prior to performing the least squares fit.

13. A method as claimed in claim 12 further comprising the step of dividing each initial image into a series of image regions prior to performing the least squares fit.

14. A method as claimed in claim 13 wherein a separate least squares fit is applied to the data for each image region.

15. A method as claimed in claim 14 wherein the least squares fit for each region uses a decoding pattern optimised for that image region.

16. A method as claimed in claim 14 wherein the least squares fit to the data for each image region comprises a Tikhonov regularization.

17. A method as claimed in claim 14 wherein the least squares fit to the data for each image region incorporates the constraint that the solution should be positive.

18. A method as claimed in claim 14 wherein the image regions overlap and only the values of the least squares fit at the centre of each region are stored.

19. A method as claimed in claim 12 wherein the step of processing each frame of data to form an initial image comprises performing a cross correlation on each frame of data with a decoding pattern appropriate to the coded aperture array used to capture that frame of data.

20. A method of forming an image from data captured from a coded aperture imaging array comprising the steps of taking a plurality of frames of data, each frame of data acquired using a different coded aperture array, taking for each frame of data a decoding pattern corresponding to the appropriate coded aperture array and processing the data to provide a first image solution for each frame of data and then deblurring the plurality of first image solutions using a set of deblurring functions derived from a set of decoding patterns each optimised for different regions of the image.

21. A method as claimed in claim 20 wherein the step of deblurring the first image solution incorporates the constraint that the solution is positive.

22. A method as claimed in claim 1 wherein the data recorded by the coded aperture imaging system is the intensity pattern of radiation within the visible, ultraviolet or infrared spectra.

23. A coded aperture imaging system comprising a detector array arranged to image a scene through a reconfigurable coded aperture mask means and a processor, wherein the reconfigurable coded aperture mask means is adapted to provide a plurality of different coded aperture arrays in series and the processor records the signal from the detector array for each different coded aperture array and applies the method as claimed in claim 1 to form an image.

* * * * *